United States Patent [19]

Franck et al.

[11] Patent Number: 5,326,520
[45] Date of Patent: Jul. 5, 1994

[54] LAMINATING FILM TO PLASTICS EXTRUDATE AND CORNERING EXTRUDATE WITH SELECTED RADII

[75] Inventors: Donald L. Franck, Warren; Edward J. Wenzel, Troy, both of Mich.; Edward Stachowicz, Bensalem, Pa.

[73] Assignee: General Motors Corporation, Detroit, Mich.

[21] Appl. No.: 53,750

[22] Filed: Apr. 29, 1993

[51] Int. Cl.⁵ ............................................. B29C 47/02
[52] U.S. Cl. ................................ 264/171; 156/244.19; 156/244.23; 156/244.24; 156/244.27; 264/151; 264/177.19; 264/285; 264/295; 264/320; 264/325; 249/141; 425/420; 425/812; 425/DIG. 16
[58] Field of Search ............... 264/171, 151, 177.17, 264/177.19, 177.20, 177.10, 285, 161, 325, 295, 320, 210.2; 425/DIG. 16, 812, 420; 249/141; 156/244.23, 244.24, 244.19, 244.27

[56] References Cited

U.S. PATENT DOCUMENTS

| | | | |
|---|---|---|---|
| 2,952,037 | 9/1960 | Ruck et al. | 264/295 |
| 3,010,861 | 11/1961 | Reese | 156/244.24 |
| 4,751,029 | 6/1988 | Swanson | 264/325 |
| 4,873,045 | 10/1989 | Fujita et al. | 156/244.24 |
| 5,023,033 | 6/1991 | Cakmakci | 264/161 |
| 5,108,681 | 4/1992 | Cakmakci | 264/151 |
| 5,171,499 | 12/1992 | Cehelnik et al. | 264/171 |
| 5,226,998 | 7/1993 | Few | 264/177.17 |
| 5,252,283 | 10/1993 | Wenzel et al. | 264/177.19 |

FOREIGN PATENT DOCUMENTS

| | | | |
|---|---|---|---|
| 57-207038 | 12/1982 | Japan | 264/151 |
| 58-78721 | 5/1983 | Japan | 156/244.24 |
| 60-97818 | 5/1985 | Japan | 425/812 |

Primary Examiner—Jeffery Thurlow
Attorney, Agent, or Firm—George A. Grove

[57] ABSTRACT

A thin ribbon of paint film is guided and applied directly to hot thermoplastics extrudate just as it exits the extrusion die by a film curving and guide plate and then by a film application wheel that is adjusted so that the film mates with and is laminated to the extrudate with an adhesive bond between the paint film substrate and the extrudate. This eliminates the need for high gloss, high metallic content thermoplastics for use as extrudate such as currently used for finished automotive side molding and allows reground thermoplastics to be used as the extrudate and finished with a paint film covering. The thermoplastic extrusion molding is then compression formed in a preform operation to establish end corners with selected radii for corner sharpness as well as reshape the part cross section. This is accomplished with a die and end cap construction which can be relatively adjusted to provide effective gas venting around the end of the die cavity on die closure.

11 Claims, 4 Drawing Sheets

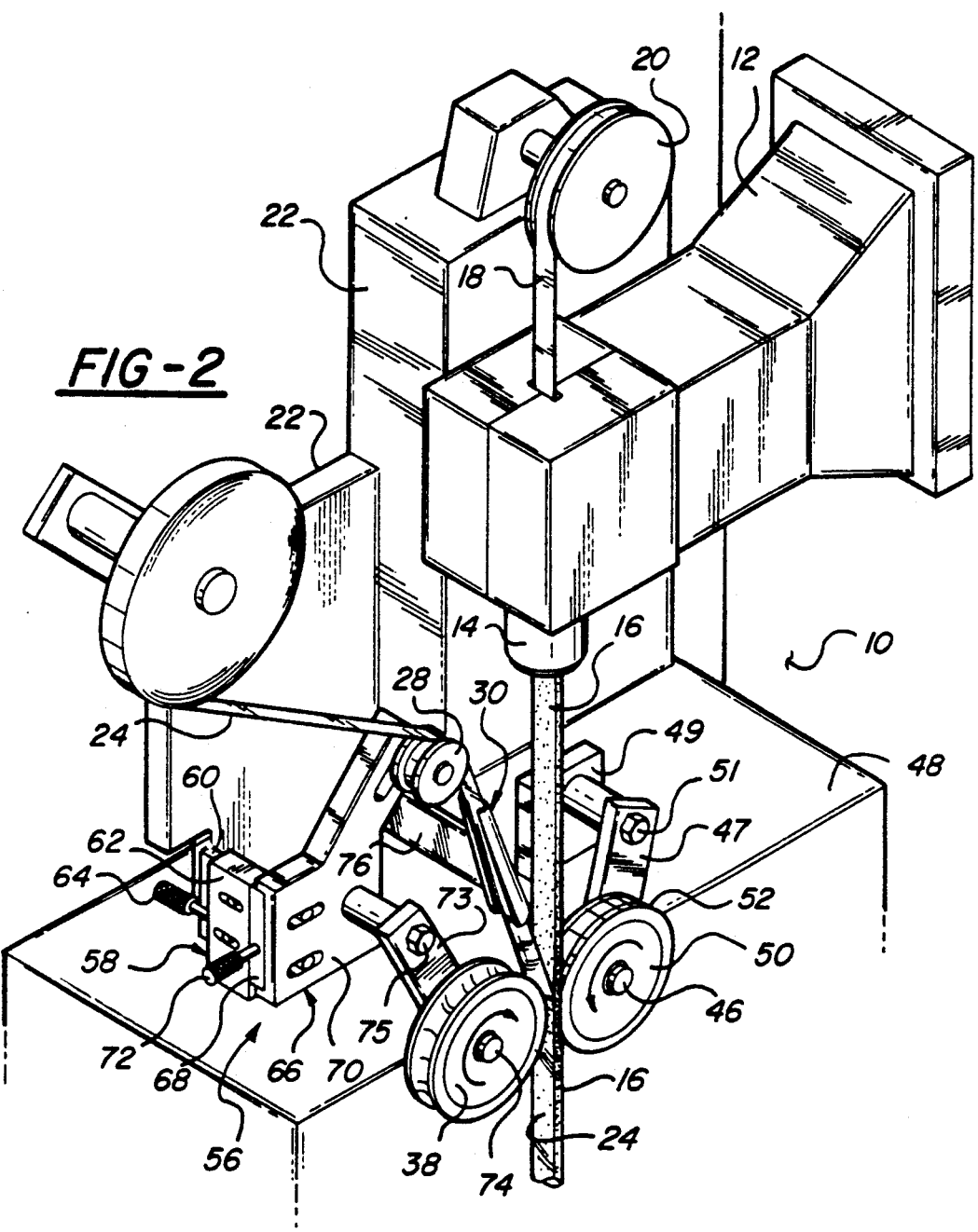

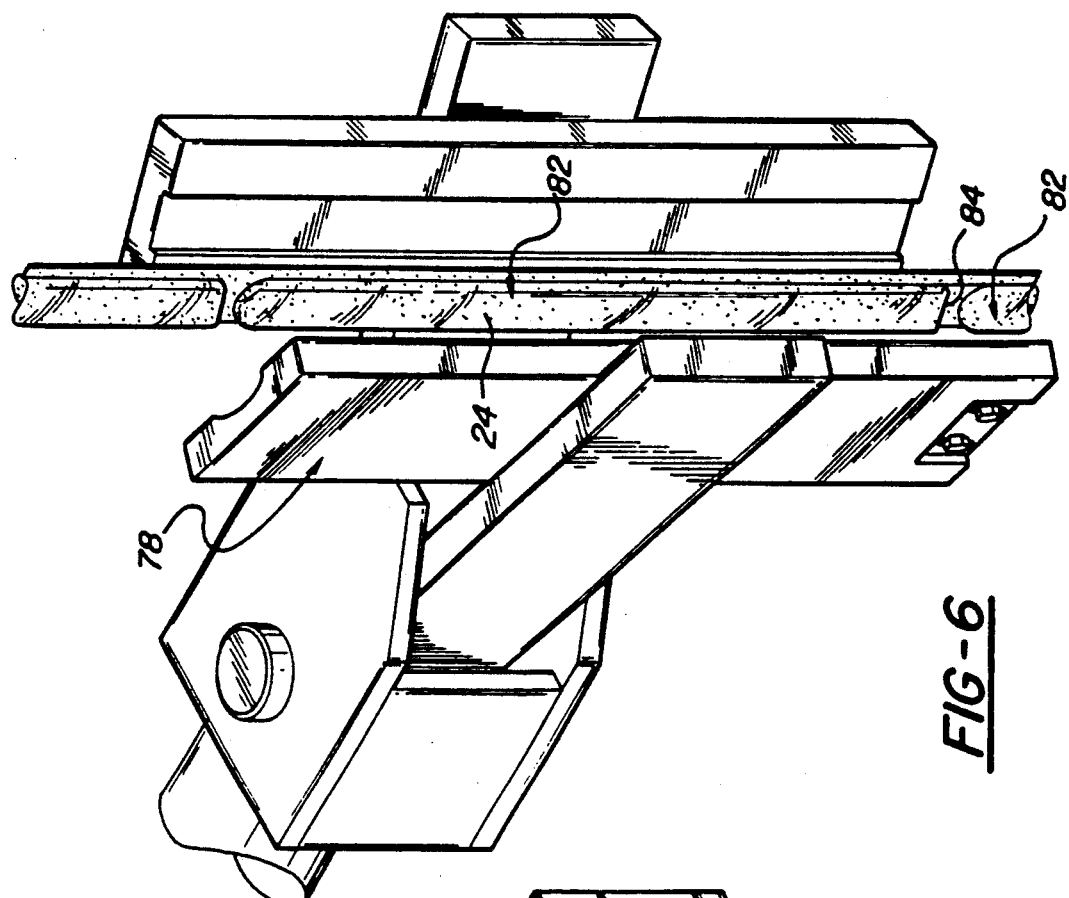
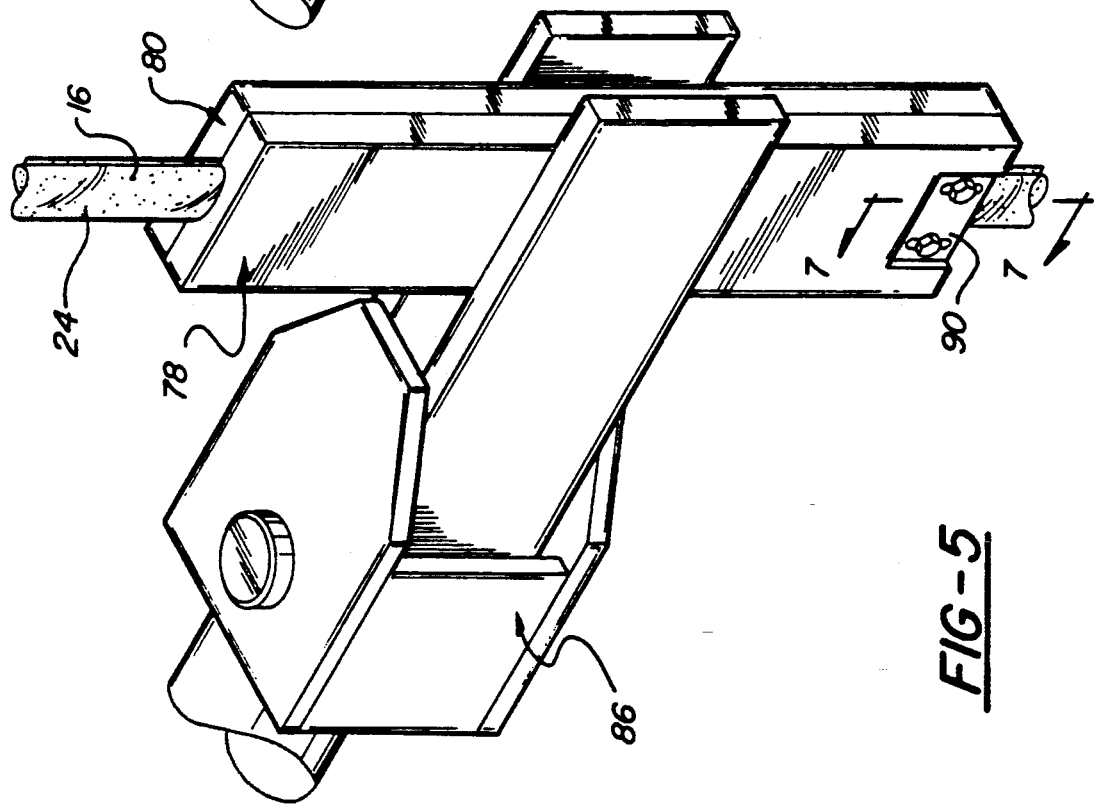

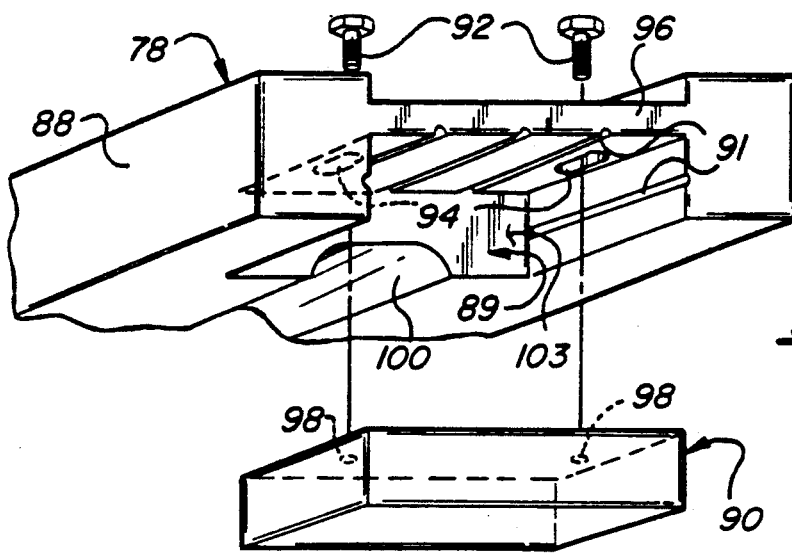
FIG-8
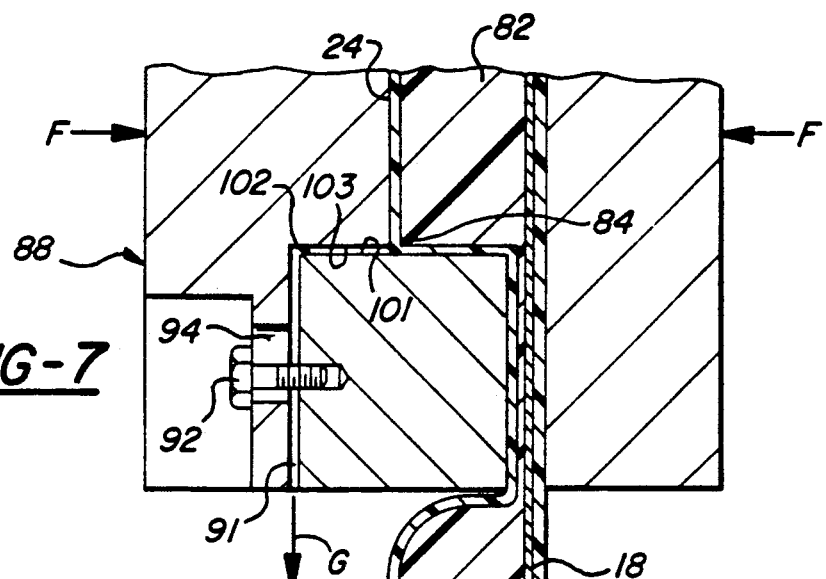
FIG-7
FIG-9
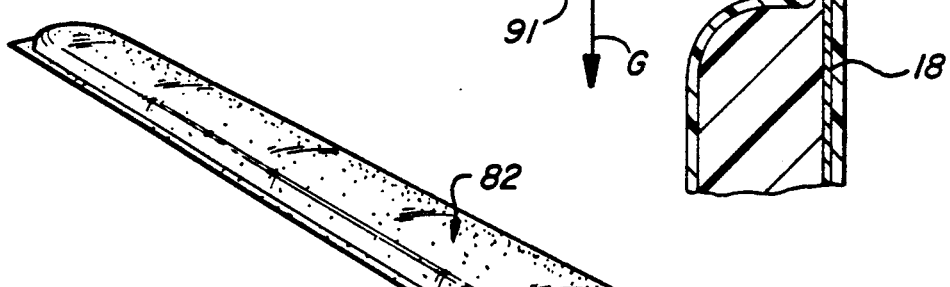
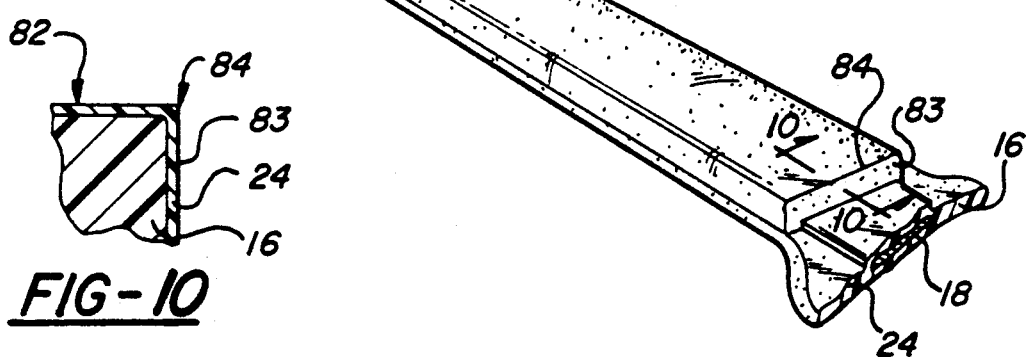
FIG-10

5,326,520

LAMINATING FILM TO PLASTICS EXTRUDATE AND CORNERING EXTRUDATE WITH SELECTED RADII

FIELD OF THE INVENTION

This invention relates to methods and mechanisms for applying paint film to profiled polymeric material and for pressure forming the extrudate with or without film so that the corner radii of the end thereof can be selectively adjusted over a corner range from well rounded to very sharp corners.

BACKGROUND OF THE INVENTION

Prior to the present invention, thin films of thermoplastic material, such as cast paint film, have been widely utilized in a variety of laminating applications, such as for printing and packaging. In more limited applications, paint films have been applied to plastic bodies such as molded profiled strips of thermoplastics for body moldings for automotive vehicles. The use of such moldings has been limited in view of the initial cost of the paint film and the frequent rejection of molded parts because of wrinkles, distortions and stretch lines in the applied film which detracted from the appearance and acceptability of the finished body molding. Additionally, because of difficulty in securely laminating the paint film to the profiled strip, problems of de-lamination of the film occurred when the body moldings were subjected to severe environments associated with vehicle use.

Furthermore, prior to the present invention, profiled extrudate used as vehicle body side moldings often had to be knife cut or reheated and post formed in a die operation, or the molding was end capped to cover the plastic end to provide acceptable terminal ends. Such methods involved complex and tedious measuring and cutting procedures or extra parts which materially added to body molding costs.

SUMMARY OF THE INVENTION

This invention is drawn to new and improved machines and methods for continuously laminating a thin thermoplastic coating film to a continuously advancing polymeric extrudate strip. After initial lamination, the still warm composite may be further shaped by compression molding to form a finely finished part with a small radius end corner (for example) and in which the film-extrudate bonding is augmented to insure the intimacy between the film and extrudate.

This invention allows the employment of an inexpensive polymeric thermoplastic base substrate material, such as recycled polyvinyl chloride (PVC), having no particular color or finish and which, after lamination of a paint film thereto and compression molding of discrete sections in the continuous strip, provides a quality finished part, such as a protective molding for vehicle body panels, of a desired color, gloss or finish. The base material is smooth and continuous as it is extruded. The film conceals minor blemishes and imperfections that may occur. Color can be readily changed by changing the paint film to the desired color while the base material color remains the same or can be of any color. With paint film properly applied to the extrudate, consistent high gloss and metallic flake distribution is provided for the finished part. If the part is applied to a vehicle or other body, color match is easier to obtain because the match color is in the paint film and not the base or substrate material.

This invention is further drawn to new and improved molding techniques and molding mechanisms for varying corner radii of the ends of the sections formed in the continuous extrudate. To this end, extrusion end-forming compression dies are gas vented at end points in adjustable dies so that trapped air does not distort proper shape formation. With this invention, the sharpness of corner radii is adjustable in accordance with the amount of vent gap opening in adjustable die components. This feature increases the utility and applicability of a specific end-forming die and reduces the need for additional dies and for die changes.

Among the objects of this invention are to provide new and improved methods and mechanisms for continuously applying films to continuously extruded thermoplastic substrates and subsequent forming in a manner that: (1) eliminates or sharply reduces film wrinkles and provides a smooth finish to extrudate, (2) coats the thermoplastic extrudate of irregular colored or clear plastics so that a finely finished composite is formed with a uniform show color, (3) augments quantity production, and (4) provides a new and improved paint film apply mechanism and method to apply and laminate such film to extrudate as it is being extruded from a die.

Among other objects, features and advantages of this invention are to provide new and improved methods and mechanisms to corner extrudate with or without film coating with corner radii that are preselected and controlled by adjustably venting compression forming dies.

These and other features, objects, and advantages of the invention will become more apparent from the following detail description and drawing.

BRIEF DESCRIPTION OF THE DRAWING

FIG. 2 is a pictorial view of a portion of the machine of FIG. 1 for laminating paint film to extrudate;

FIG. 3 is a sectional view taken generally along sight lines 3—3 of FIG. 1 showing the application of paint film to plastic extrudate;

FIG. 4 is a pictorial view of a feeder and guide mechanism to guide and curve paint film to fit the profile of the extrudate;

FIG. 5 is a pictorial view of a portion of compression mold and a scissors-type actuator in a closed position;

FIG. 6 is view of the mold and actuator of FIG. 5 in an open position;

FIG. 7 is a sectional view of part of the mold of FIG. 5 taken generally along sight lines 7—7 of FIG. 5;

FIG. 8 is an exploded pictorial view of an end portion of a portion of the mold;

FIG. 9 is a pictorial view of a part molded in accordance with this invention with parts broken away; and FIG. 10 is a fragmental cross-sectional view taking generally along lines 10—10 of FIG. 9.

DETAILED DESCRIPTION OF THE PREFERRED EMBODIMENTS

Figure 1:
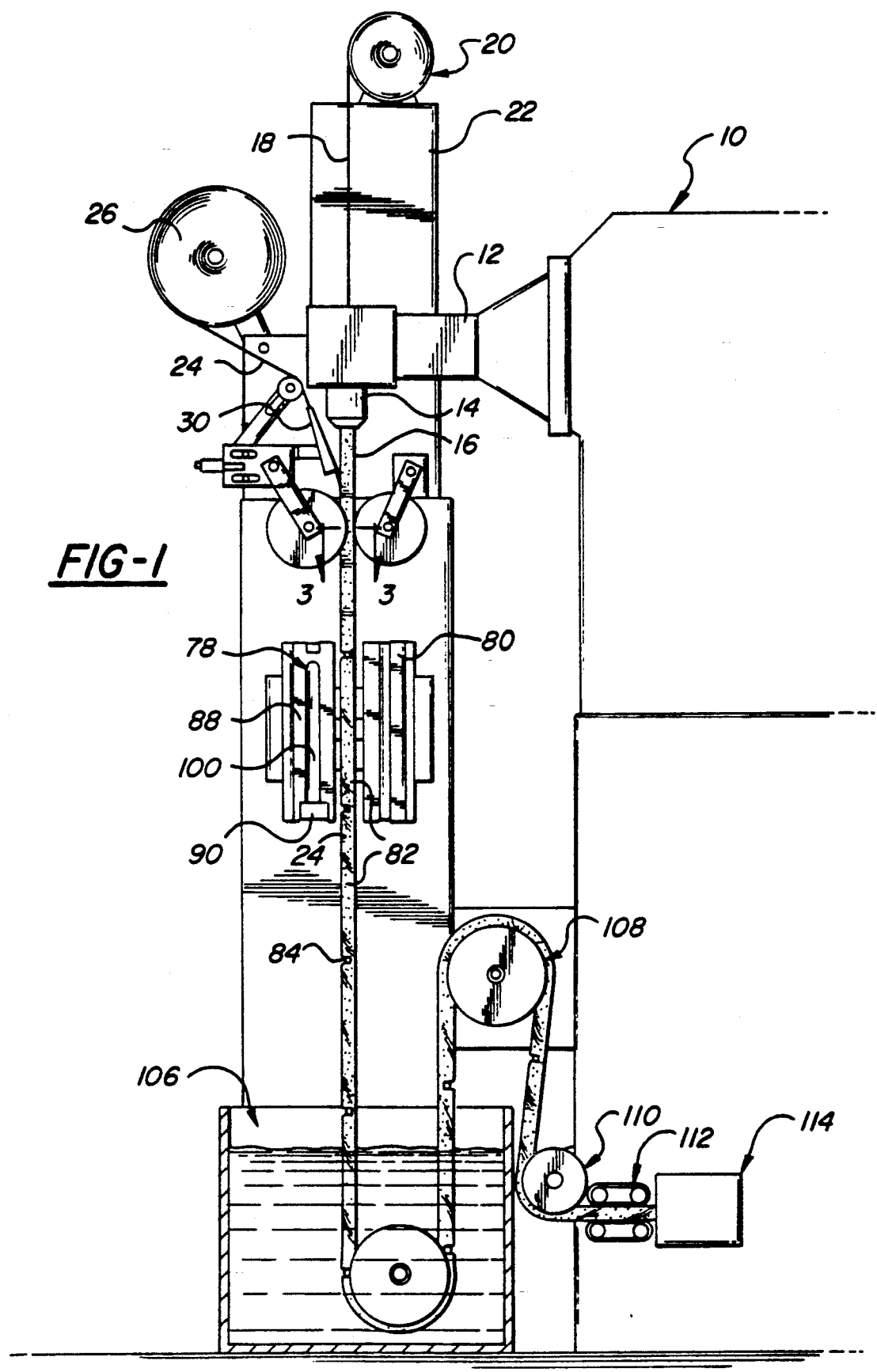
FIG. 1 is a diagrammatic side view of a machine for laminating paint film to extrudate, and a compression molding unit for reforming the film/extrudate laminate and for effecting the precisioned end cornering of the extrudate over a wide range of radii.

Turning now in greater detail to FIGS. 1 and 2 of the drawing, there is illustrated a plastics extruder 10 having a laterally projecting head 12 with a downwardly extending extrusion die 14 that generates a profiled ribbon of hot (e.g., 350° F.) thermoplastic (polyvinyl chloride, PVC) extrudate 16 which has a thin aluminum foil stabilizer 18 therein fed from foil roll 20 into the extrusion die 14. The roll 20 is mounted above the extrusion die on support 22, and the foil stabilizer 18 fed therefrom is in line with the extrusion die that extends downwardly so that the flow of the extrudate with the foil stabilizer therein is directed in a straight path as shown in FIGS. 1 and 2.

Immediately after the hot extrudate 16 with its smoothly rounded, convex upper surface exits from the extrusion die, a thin ribbon of a multilayer painted thermoplastic film 24, fed from a support mounted film supply roll 26 and routed across idler pulley 28, is guided and shaped by a feed and guide plate 30 so that the paint film is aligned with and curved to correspond with the line and profile of the extrudate.

The multilayer thermoplastic film 24 is quite thin and stretchable in both longitudinal and lateral directions. It typically comprises a heat-activated adhesive layer of 0.5 mil thickness, a fluoropolymer layer (one mil thick) having a high gloss or containing highly metallized pigment, and a clear top coat of one mil thickness. An optional release sheet of polyester or other suitable material, not illustrated, if employed is removed from the film before the film is laminated to the PVC extrudate. Many other variations of the film composition exist, some without release sheets, and are usable in this invention. Generally, it has been found that increasing the film thickness increases color gloss retention under compression molding stress and strain forces experienced by a finished part. A thinner film is less resilient than the thicker films and tends to lose some gloss at higher temperatures while extensibility in both longitudinal and lateral direction is typically much higher.

FIG. 4 illustrates the fill guide plate 30 in greater detail. This guide plate is fabricated from sheet steel having a flat entrance 32 and is convexly and progressively increased in curvature to the exit end 34 of the guide plate which is positioned just above the paint film apply wheel 38. The opposite edges 40 and 42 of the guide plate are rolled inwardly to provide side guides to positively retain the film in the convexly curved guide plate.

With this construction, the advancing film is curved to generally match the curvature of the extrudate and the face or the show surface of the film is outboard of the guide plate 30 so that it is not abraded by the guide plate 30. The concave inner surface of the film exiting from the guide plate is forced by the contoured apply wheel 38 into interfacing contact with the convexly curved outer surface of the profiled hot extrudate, as shown in FIGS. 1 through 3, and is rolled smoothly thereon by the concave outer plastics rim 44 of rotating apply wheel 38. It is seen that the shape of rim 44 is complementary to the outer surface of extrudate strip 16 with allowance for the interposed film 24.

The PVC extrudate has a temperature in the range of about 300° F. to 350° F. and the unheated film is applied to the extrudate under load by apply wheel 38. The substrate layer of calendared-PVC of the paint film readily laminates with a strong adhesive bond to the extrudate. Because the film has been initially curved by the guide plate and subsequently stretched by the contoured apply wheel 38 onto the convex profile of the extrudate (FIG. 3), this lamination is achieved without wrinkles or surface imperfections in the film.

A rotatable wheel 50 is mounted on an upper flat surface 48 of support 22. This wheel has a flattened circumferential surface 52 that contacts the flat back of the profiled extrudate 16 and has a one-way freewheel device, not shown, so that it rotates only counterclockwise. This construction reduces or prevents any shock wave or any force reversal directed toward the extruder die 14 to insure uniformity in the production of extruded moldings. Wheel 50 is mounted by pivot 46 to the end of arm 47 which is adjustably fixed to a support block 49 by a shouldered bolt 51 or other fastening means.

The apply wheel 38 is adjustably mounted on the support 22 by an adjustment assembly 56 which precisely positions the film guide plate 30 and the feeder wheel 38 in a position relative to the extrudate so that the film strip 24 will be accurately aligned with and applied to the extrudate so that lamination of the film to the outer profiled surface of the extrudate is made without any wrinkles or other imperfections.

The adjustment assembly 56 comprises a first micrometer adjustment mechanism 58 having an interior plate 60 secured at a right angle to the support 22 and has a top plate 62 movably mounted on the interior plate 60. The top plate is moved in measured increments by a first micrometer screw 64 mounted on the interior plate and fixed to the top plate 62 to adjust the apply wheel 38 and the guide plate 30 in a transverse plane relative to the extrudate 16.

To adjust the apply wheel and feeder plate toward or away from the extrudate, a second micrometer adjustment mechanism 66 is operatively connected to the first micrometer mechanism 58. More particularly, the second micrometer mechanism 66 has a bottom plate 68 fixed to the top movable plate 62 of the first micrometer mechanism and a top plate 70 movably mounted on the bottom plate 68 by a second micrometer screw 72.

The apply wheel is rotatably mounted at the end of arm 73 by pivot 74. The upper end of the arm 73 is fixed by shouldered bolt 75 to the movable top plate 70. The guide plate 30 is mounted to the top plate 70 by support arm 76.

By adjusting the first micrometer screw 64, the film guide plate 30 and apply wheel 38 are moved transversely with respect to the extrudate to align the film with the extrudate. By adjusting the second micrometer screw 72, the apply wheel and guide strip can be moved toward or away from the vertical plane of the extrudate so that the film is fed directly onto the hot extrudate with sufficient pressure and a high quality lamination bonding is achieved.

FIG. 3 shows the extrudate 16 with its outer face convexly curved with the paint film 24 laminated thereto. The extrudate can be made from a grind of recycled PVC or other recyclable thermoplastics material, and the apply wheel stretches the film bi-axially along the width and length thereof as it passes through the apply wheel so that the film is evenly applied and bonded to the extrudate without being torn or wrinkled. Any minor imperfections in the outer surface of the extrudate are covered by the film without being apparent. Furthermore, our practice of continuously preshaping and stretching the decorative film over the curved extrudate surface results in a more smooth and continuous lamination that better undergoes the subsequent compression molding operation.

After leaving the apply wheel and while still at a temperature above 300° F., the PVC extrudate 16 with the paint film laminated thereto is compression molded by a pair of cooled (−10° F.) mold halves 78 and 80. In this example, the molds 78 and 80 shape the composite film and extrudate into discrete vehicle side molding sections 82 with uniform flat end walls 83 and sharp corners 84 formed on at least one of the ends of each section. In the molding section 82 that is depicted, the profile of the whole length of the section 82 has been compression molded and flattened (FIG. 9) as compared to its extruded profile (FIG. 3). In other embodiments, molds like 78 and 80 may only be employed to form the end of each molding section 82. The high compression loads directed onto the paint film and extrudate enhances the adhesive bonding therebetween to such a point that the film and extrudate become unitized to minimize possibility of delamination.

FIGS. 5 and 6 respectively show the mold halves 78, 80 in their closed and opened positions as operated by an over center clamping jaw mechanism 86, such as described in U.S. Pat. No. 5,114,650, issued May 19, 1992 to D. L. Franck et al, assigned to the assignee of this invention and hereby incorporated by reference. The mold halves advance with the laminated strip, perform their compression molding operation and retreat upstream to repeat their operation.

As shown in FIGS. 7 and 8, the female mold half 78 has two major components: a main die body 88 which is hogged out at one end so that rectilinear recess 89 is formed to receive a rectilinear die insert end cap 90. The walls in the main die 88 defining the recess 89 have longitudinally extending grooves 91 formed therein for gas escape during molding as will be described.

The insert end cap 90 closely fits in recess 89 but is mounted for longitudinal adjustment therein by use of screws 92, which extend through elongated adjustment slots 94 formed through a top web 96 of the mold of the interior wall which provides the top of the cutout. The screws extend into threaded engagement with aligned openings 98 in the end cap. The die insert end cap can be adjusted to completely close the end of the female die cavity 100 and can be moved fore and aft relative to the cavity 100 and secured in a selected adjusted position by tightening screws 92 down to provide a variable circumferential vent 102 for the die cavity 100 for enhancing pressure molding. The distance or clearance between the inboard end wall 101 of the insert and the end wall 103 of the die 88 through which the female cavity extends determines the amount of vent opening and gas venting and thereby the radius of the end of the part being molded. In effect, the female cavity is longitudinally extended by the selected amount of clearance for venting.

When compression forming a thermoplastic extrusion molding such as extrudate 16, air and other gas trapped within the forming die between the plastic material and the die itself must be released in order for the plastics to completely fill the female cavity 100 of the die. With sharp corners provided in female cavities of prior dies, air entrapment was difficult to eliminate so that parts with rounded or large radiused corners generally result. Such corners are generally unacceptable from an aesthetic point, causing the molding to be rejected on inspection.

In this invention, the die end cap 90 becomes important in forming a satisfactory square end part with sharp corners. Instead of utilizing a one-piece die, the die is made into two or three parts depending on whether one or both ends of the extrudate need venting for end corner squareness.

To obtain the smallest or sharpest radius possible, the end cap is placed and secured by threaded fasteners 92 at the maximum distance away from the main die for maximum venting just before flashing occurs. To obtain the largest radius possible, the end cap is butted against the main die body as tightly as possible to close the end of the female cavity. A seal between the main body and end cap may be necessary to completely eliminate air venting so that the trapped air and gas stops the extrudate from filling the corners of the die.

Accordingly, the larger the gap between the main die body and the end cap, the greater the volume of gas flow from the corner of cavity 100 and therefore better plastic flow into that area. The smaller the gap between the main die body and the end cap, the lesser the volume of air flow between the two, resulting in a more restricted flow of plastic to that region so that the larger radius corners are produced.

This technique accordingly allows for selection of various part end radii without the expense of re-tooling the forming die. This is important when the moldings are used on vehicles which require at least a very small radius such as 0.5 mm on all molding corners. Variable venting of the form die accordingly allows adjustment of the radius to conform to a wide range of corner sharpness requirements.

FIG. 9 pictorially illustrates one of the discrete sections 82 that has just been compression molded. In this molding operation, the insert die is set relative to the main die so that a large vent 102 is established around the entire end of the female cavity. When the mold clamps are closed by the clamping jaw mechanism 86, the extrudate fills the female cavity and is end blocked by the end wall 101 of the insert die, as shown in FIG. 7. Air and other gasses G vent without backpressure through the vent passages 102 and vent grooves 91 provided in the female die assembly.

There is no entrapped air or other gas in the die assembly. Since vent 102 is so small in width, the extrudate cannot enter into the vent passage and a sharp corner radius of the 0.5 mm is produced, as diagrammatically shown in FIG. 10.

In this construction and as more completely disclosed in the above referenced U.S. Pat. No. 5,114,650, the alligator-type operating jaws are mounted to a die carrier which is mounted for up and down movement on an extensible shuttle carrier. As the part is being molded, the carrier moves downward and releases the preformed extrudate into a water bath 106. From the water bath, the preformed extrudate is curved, turned upwardly to an idler 108 and into a grooved fixture 110. From grooved fixture 110, the extrudate feeds through a puller 112 to a router machining assembly 114 which shaves and finishes the extrudate by removing the flash therefrom.

While a preferred embodiment of the invention has been shown and described, other embodiments will now become apparent to those skilled in the art. Accordingly, this invention is not to be limited to that which is shown and described but by the following claims.

The embodiments of the invention in which an exclusive property or privilege is claimed are defined as follows:

1. A method of continuously applying a decorative strip having a show surface to a shaped surface of a continuously die extruded thermoplastic extrudate strip while the extruded strip is at a thermoformable temperature above ambient temperature, comprising:

advancing an unheated decorative film strip parallel to and overlying the shaped surface of the extruded strip, passing said decorative film through a guide plate so as to progressively preshape the film across its width to the shape of said shaped surface of said extruded strip while maintaining said show surface of said film outboard of said guide plate, and then continuously pressing the preshaped film against the shaped surface of the extrudate at a fixed distance from the extrusion die to continuously bring it into coextensive engagement with the extrudate and bonding the film in lamination thereto.

2. A method of continuously applying a thermoplastic decorative strip having a show surface to a curved surface of a continuously extruded thermoplastic extrudate strip while the extruded strip is at a thermoformable temperature above ambient temperature, comprising:

advancing a continuous unheated decorative film in the direction of flow of the extruded strip, passing said decorative film through an elongated guide plate so as to progressively curve and preshape the film across its width to a shape corresponding to the curved shape of said surface of the extrudate while maintaining said show surface of said film outboard of said guide plate, and then pressing the shaped film into engagement with the curved surface of the extrudate with a applicator roller having a rolling surface complementary in shape to the underlying extrudate surface, the advancing film being tensioned between the applicator roller and an upstream idler roller, the tensioning and shaping of the decorative film and the pressure of the applicator roller cooperating to continuously bring it into smooth, coextensive engagement with the extrudate and bonding the above ambient temperature extrudate coextensively in lamination with the applied film.

3. A method as recited in claim 2 in which compression molded segments are formed in the laminated strip by deformation of both the decorative film and extrudate while the extrudate is at an above ambient temperature.

4. A paint film apply machine for an extruder which has an extrusion die for generating an elongated strip of heated extrudate having a predetermined profile, said machine having a supply of ribbon-like paint film provided with a show surface and a width for coating at least a portion of the width of said extrudate, an elongated film guide plate means for initially guiding said film in a flat configuration into said guide plate means and toward the profiled surface of said extrudate and afterwards progressively curving said film with said show surface located outboard of said film guide plate means so that it can fit the profile of said extrudate when it exits said guide plate means, and film apply means provided with a curved surface for forcing said curved film into contact with said profiled extrudate so that the substrate of said film chemically bonds to said heated extrudate.

5. The paint apply machine of claim 4, wherein said film guide plate means has opposing edge means to keep the film on said film guide plate means as said paint film moves thereon for subsequent laminating with said extrudate, and said film guide plate means having a convexly curved support surface so that the substrate of the film moving thereacross is concavely formed for subsequent lamination with said heated extrudate.

6. The machine of claim 4, wherein said film apply means is an apply wheel which rolls the curved paint film onto the heated extrudate so that said paint film laminates with said extrudate.

7. The machine of claim 6 further including first means for adjustably moving said apply wheel and said film guide means into alignment with said extrudate and second means for adjustably moving said film toward and away from physical contact of said extrudate.

8. A mold comprising a plurality of mold portions associated with one another for movement between open and closed positions and defining a mold cavity therein, one of said mold portions having at least first and second forming die sections, each of said sections having end wall means spaced from one another, said end wall means of the second of said die sections defining one end of said mold cavity to mold plastics material supplied to said cavity into a molded part with a predetermined shape having at least one end with a squared corner having a minimized radius as determined by the amount of spacing between end walls of said first and second forming die sections, the first of said of said forming die sections having a recess therein which extends through the end wall means thereof and forms a portion of said cavity, gas venting means provided by the space between said end wall means of said sections, gas discharge means pneumatically communicating with said gas venting means for transmitting and exhausting gases from said mold generated during molding so that said plastics material will flow against said end wall of said second section and completely fill said cavity to fully form said molded part with said squared corner, and means connecting said second die sections to said one of said mold portions for adjustable movement relative thereto so that the gas capacity of said venting means can be varied to vary the radius of said squared corner of said one end of said molded part.

9. The mold of claim 8, wherein said gas venting means is dimensioned so as to prevent any substantial flow of said plastics material therein.

10. A method for making finish moldings having a finished show surface for application to support surfaces comprising the steps of:

extruding a profiled strip of heated plastics base material, passing a paint film of plastics material through a guide plate for guiding and progressively preforming said paint film of plastics material into a shape for fitting on said heated and profiled strip while maintaining said show surface of said paint film outboard of said guide plate as said strip is extruded, applying said preformed paint film onto said profiled strip so that it laminates directly thereto and so that said strip and film form a composite with said film providing a finish coat therefor, and compression forming said composite with a multipart die so that said composite is finished with a squared corner at one end within a predetermined range of corner radii.

11. A mechanism for making moldings of predetermined lengths with a squared end corner and having a finished show surface for attachment to support surfaces comprising:

plastics extrusion means for extruding a profiled strip of heated plastics material, a supply of paint film, film guiding and film curving means for curving said film while guiding said film from said supply to a station adjacent to said strip while said strip is being extruded from said plastics extrusion means, apply wheel means located at said station for applying said film to said profiled strip so that it laminates thereto, compression mold means having a plurality of mold portions associated with one another and relatively movable between open and closed positions and defining a mold cavity therein, one of said mold portions having at least first and second forming die sections, each of said die sections having end wall means spaced from one another, said one of said end wall means defining one end of said cavity to mold plastics material supplied to said cavity into a part with a predetermined shape having at least one end with a squared corner having a minimized radius as determined by the amount of spacing between end walls of said first and second forming die sections, the first of said forming die sections having a recess therein to define a portion of said cavity, gas venting means provided by the spacing between said end wall means of said sections and gas discharge means pneumatically communicating with said gas venting means for transmitting and exhausting gases from said mold generated during molding so that said plastics will completely fill said cavity to fully form said molded part with said squared corner.

* * * * *